Patented Nov. 13, 1945

2,388,928

UNITED STATES PATENT OFFICE 2,388,928

SEPARATING BUTADIENE FROM ACETYLENES

Charles E. Morrell, Roselle, and Miller W. Swaney, Linden, N. J., assignors to Standard Oil Development Company, a corporation of Delaware Application September 26, 1942, Serial No. 459,758

9 Claims. (Cl. 260—681.5)

This invention relates to improvements in the separation of butadiene from hydrocarbon mixtures and particularly in the separation of butadiene from acetylenes.

In the extraction of acetylene-containing and butadiene-containing mixtures of hydrocarbons having 4 carbon atoms to the molecule and hereafter identified as C$_4$ cuts with cuprous salt solutions of the basic type, for example, ammoniacal cuprous acetate solutions, both of the above-mentioned types of hydrocarbon unsaturates are dissolved into the copper phase at the low temperature of extraction (e. g., 20–40° F.). If this solution is then flash-heated to say 180° F., both the butadiene and alkyl acetylenes (R—C≡CH) are evolved. Thus is obtained a butadiene product which may contain several thousand parts per million (or up to several-fold the acetylene content of the C$_4$ cut extracted) of these acetylenes. Since these impurities tend to affect or impair the reaction qualities of the butadiene product, it is very desirable to produce butadiene substantially free of these acetylenes. This is particularly desirable since a copper solution contacted with a C$_4$ cut containing 25% of butadiene and 0.1–1.0% of acetylenes will remove both of these unsaturates practically quantitatively and regenerate them both on heating (desorption).

Using a copper solution containing 3 mols per liter of cuprous ions, 4 mols per liter of acetate and 11 mols per liter of total ammonia, it has been found that at 32° F. pure butadiene gas and pure ethyl-acetylene gas possess the following solubilities in this solution to give completely homogeneous saturated (precipitate-free) copper phases.

| Pure hydrocarbon | Volumes of gaseous C$_4$ absorbed per volume of copper solution |
|---|---|
| 1,3-butadiene, CH$_2$=CH—CH=CH$_2$ | 25 vols./vol. |
| Ethyl acetylene, CH$_3$—CH$_2$—C≡CH | 8–10 vols./vol. |

Therefore, this cold copper solution is capable of holding fairly large quantities of these dissolved unsaturates. Now, for each concentration of dissolved hydrocarbon it has been found that the copper solution possesses, at a definite temperature, a measurable hydrocarbon partial pressure, for example, a butadiene partial pressure, and/or an acetylene partial pressure. Although butadiene and ethyl acetylene, for instance, possess solubilities of the same order of magnitude in copper solutions, it has been found that their respective partial pressures from these solutions are of amazingly different magnitudes. For example, the before-mentioned copper solution containing about 0.2 mol per liter of butadiene possesses a butadiene partial pressure at 80° F. of about 450 mm. Hg while the same solution containing about 0.2 mol per liter of ethyl acetylene possesses an ethyl acetylene partial pressure of only about 2 mm. Hg at the same temperature. At higher temperatures the relative difference is even more pronounced. Further, however, it has been found that at higher temperatures the absolute acetylene partial pressures show marked increases.

According to this invention the preparation of high-purity butadiene substantially free of alkyl acetylenes and like contaminants is accomplished through the employment of a continuously-operated countercurrent extraction system involving a low temperature (e. g., 0 to 70° F.) absorption stage, a butene-stripper stage (likewise countercurrent tower) at a slightly higher temperature (40° to 100° F.), a countercurrently operated first-stage butadiene-desorption (e. g., tower with 70–80° F. top temperature and 140° F. to 180° F. bottom temperature), and finally a high temperature (160° to 230° F.) second-stage acetylene-desorption.

Referring to the drawings.

Figure 1:
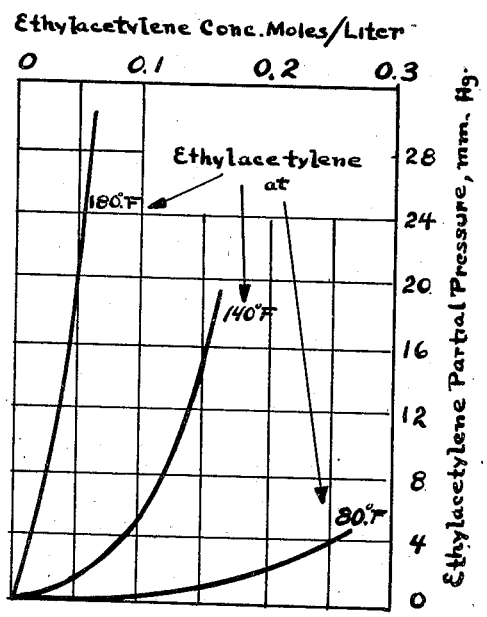
Fig. 1 shows the partial pressure of acetylenes from a 3 molar ammoniacal cuprous salt solution (described above) containing dissolved copper acetylides.
Figure 2:
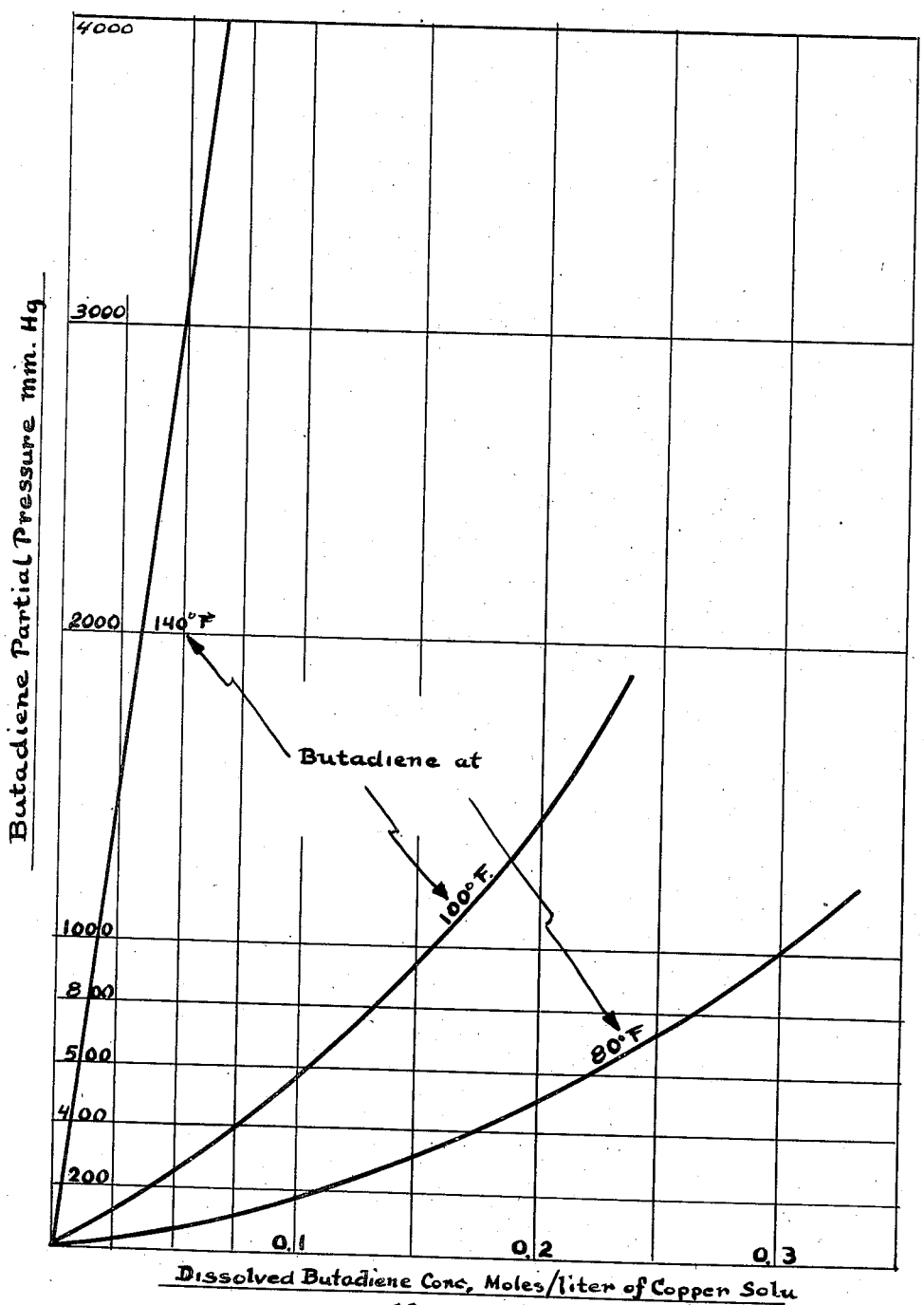
Fig. 2 shows the partial pressures of butadiene from a 3 molar ammoniacal cuprous salt solution (described above) containing dissolved butadiene.
Figure 3:
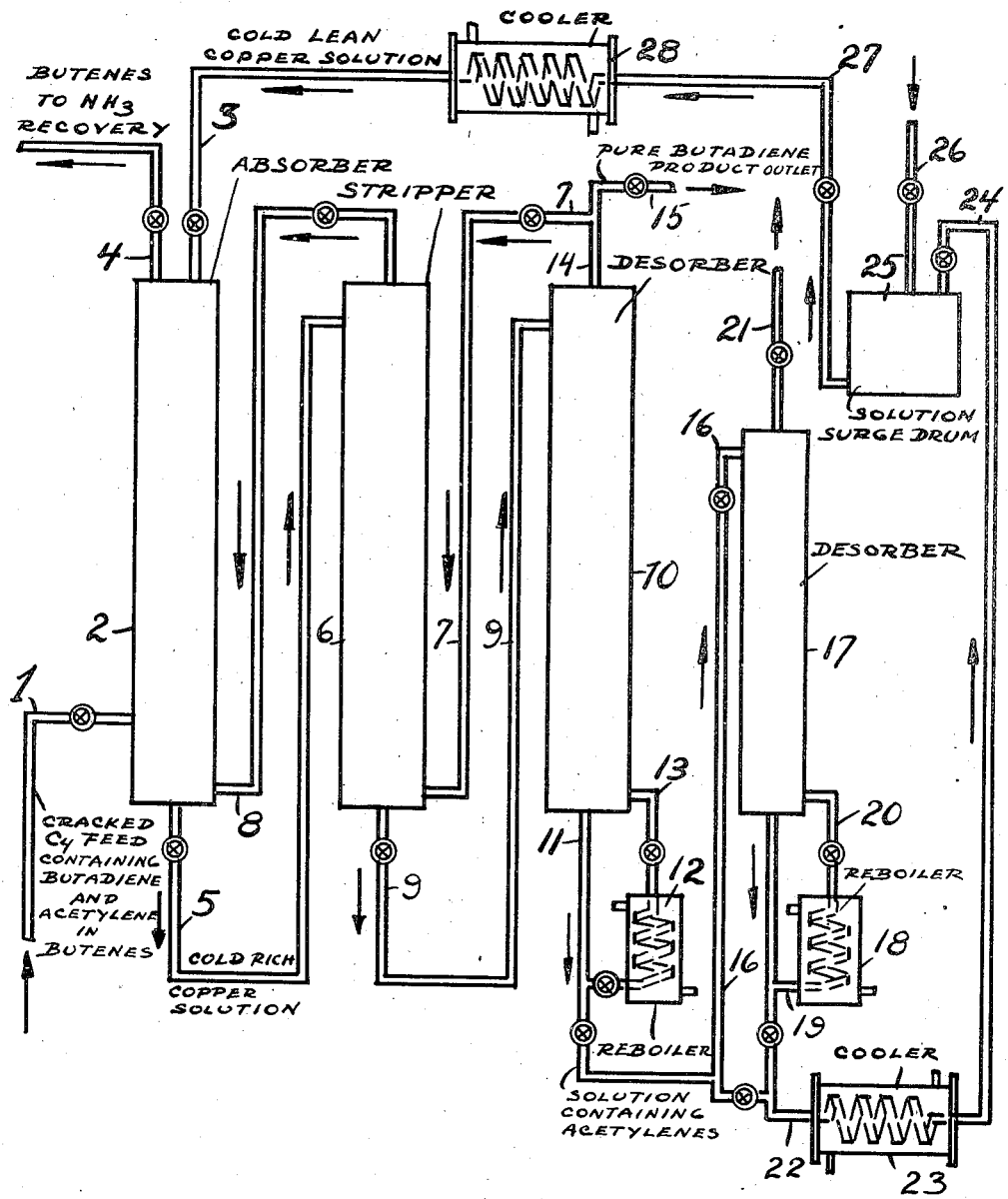
Fig. 3 shows a diagrammatic flow of materials in extraction operations.

Referring to Fig. 3, numeral 1 denotes a pipe through which is passed the C$_4$ cut containing butadiene, actylenes, butenes, allenes, etc. This mixture is passed through pipe 1 into absorber 2 where a temperature of about 0° to 70° F., preferably 20° to 40° F. is maintained. The hydrocarbon mixture in absorber 2 passes in countercurrent flow to an ammoniacal cuprous acetate solution introduced by pipe 3. The unabsorbed gases are removed through pipe 4 and the ammoniacal cuprous acetate solution with butadiene and acetylene in solution is passed through pipe 5 into stripper 6 which is maintained at temperatures ranging from 40° to 100° F., preferably from 60° to 70° F. The ammoniacal cuprous acetate solution flows downwardly through stripper 6 in countercurrent flow to recycled butadiene introduced by means of pipe 7 and any butene that is freed by the stripper action of butadiene is returned to absorber 2 by means of pipe 8. The ammoniacal cuprous acetate solution with butadiene, acetylene and other absorbed gases such as allenes, is passed through pipe 9 into desorber 10 which is maintained at a temperature ranging from about 70° F. up to about 120° to 180° F., preferably 140° to 150° F. Ammoniacal cuprous acetate solution flowing into this tower is passed downward through pipe 11 to the reboiler 12 and is circulated by means of pipe 13. The upper part of the tower is maintained at a temperature of about 70° to 80° F. and pure butadiene, which may contain some ammonia is removed through pipe 14, part of the butadiene being recycled through pipe 7 to the butene stripper 6. The remaining part of the butadiene is passed by means of pipe 15 to a water scrubber to remove ammonia (not shown). The remaining part of the ammoniacal cuprous acetate solution removed from the lower part of the desorber tank by means of pipe 11 and containing acetylenes and allenes but substantially free of butadiene, is passed through pipe 16 to the upper part of the second desorber 17 which is maintained at a temperature ranging between 160° to 230° F., preferably 180° to 200° F. by means of reboiler 18 and pipes 19 and 20. Acetylenes and allenes are recovered from this desorber by means of pipe 21 where they are passed to the wash tower to recover ammonia and then to storage (acetylenes and allenes being readily separated from each other by fractionation). The remaining part of the ammoniacal cuprous acetate solution is passed through pipe 22 through cooler 23 and pipe 24 to solution surge drum 25 where ammonia lost during heating is introduced through pipe 26 from which ammoniacal cuprous acetate solution is passed to pipe 27 through cooler 28 to pipe 3 and recycled to the first absorber. Pressures ranging from 0 to 25 pounds per square inch gauge may be maintained throughout the whole system.

Cuprous solutions containing amines other than ammonia may be used, for example, those cuprous solutions containing pyridine, methyl amine, dimethyl amine and ethyl amine.

We claim:

1. Process of separating and segregating diolefins from hydrocarbon mixtures containing diolefins and alkyl acetylenes which comprises contacting the hydrocarbon mixture with a basic cuprous salt solution, separating the cuprous phase from the unabsorbed hydrocarbons, and subjecting the basic copper salt solution to successively higher temperatures to fractionally release diolefins and alkyl acetylenes separately in substantially pure form.

2. Process of separating and segregating butadiene from a mixture of C4 hydrocarbons containing butadiene and alkyl acetylenes which comprises contacting the hydrocarbon mixture with an ammoniacal cuprous salt solution, separating said solution containing dissolved unsaturated hydrocarbons from the unabsorbed hydrocarbons, and subjecting the copper solution to successively higher temperatures to fractionally release butadiene and alkyl acetylenes separately in substantially pure form.

3. Process of separating and segregating butadiene from a mixture of C4 hydrocarbons containing butadiene and alkyl acetylenes which comprises contacting this mixture with an ammoniacal cuprous salt solution containing sufficient ammonia to prevent precipitation of copper acetylides, separating said copper solution containing dissolved unsaturated hydrocarbons from unabsorbed hydrocarbons, and raising the temperature of the solution successively to fractionally release butenes, butadiene, and alkyl acetylenes separately and in substantially pure form.

4. Process of separating and segregating butadiene from hydrocarbon mixtures containing butadiene and alkyl acetylenes which comprises continuously contacting the hydrocarbon mixture with an ammoniacal cuprous salt solution at about 0 to 70° F. to extract the butadiene and alkyl acetylenes along with some butenes, separating the copper solution and heating to about 40° to 100° F. to release butenes, thereafter heating the solution from 120° to 180° F. countercurrently to expelled butadiene and obtaining the latter in substantially pure form, and heating the butadiene-free solution to 160° to 230° F. to release alkyl acetylenes.

5. Process of separating and segregating butadiene from hydrocarbon mixtures containing diolefins and alkyl acetylenes which comprises contacting a hydrocarbon mixture containing diolefins and alkyl acetylenes with a cuprous salt amine solution in which the amine is one selected from the group consisting of methyl amine, dimethyl amine, ethyl amine and pyridine, separating the cuprous phase from the unabsorbed hydrocarbons and subjecting the basic copper salt solution to successively higher temperatures to fractionally release butenes, diolefins and alkyl acetylenes separately in substantially pure form.

6. Process of separating and segregating butadiene from a mixture of hydrocarbons containing butadiene and acetylenes which comprises absorbing the acetylenes and the butadiene from the said hydrocarbon mixture by contacting with a basic cuprous salt solution in which the ammonia is maintained at a high enough concentration to maintain the copper acetylides formed in dissolved form, heating the cuprous salt solution to a temperature range of from 40° to 100° F. to remove absorbed butenes, further heating the cuprous salt solution to a temperature ranging from 120° to 180° F. while maintaining a reflux temperature ranging from 70° to 80° F., so that only butadiene will be desorbed, further heating the cuprous salt solution substantially free of butadiene to temperatures ranging from 160° to 230° F., to remove acetylenes.

7. Process of separating and segregating butadiene from hydrocarbon mixtures which comprise contacting a hydrocarbon mixture containing butadiene with an ammoniacal cuprous salt solution containing about 11 mols per liter of ammonia, separating the cuprous salt solution and heating to a temperature ranging from 60 to 70° F. to expel butenes and passing in countercurrent flow to butadiene, separating the cuprous salt solution and heating to a temperature ranging from 140° to 150° F. in the bottom of a tower in which the upper part of the tower is maintained at a temperature ranging from 70° to 80° F., separating butadiene from the said tower and recycling a fraction of the butadiene to strip butenes from the cuprous salt solution at 60° to 70° F., passing the residual cuprous salt solution to a second desorption tower and heating to a temperature ranging from 180° to 200° F. and removing acetylenes.

8. Process of separating and segregating butadiene which comprises contacting a hydrocarbon mixture containing butadiene, acetylenes and allenes at a temperature ranging from 20° to 40° F. with a cuprous salt solution, heating the said cuprous salt solution after it has been separated from the unabsorbed hydrocarbon mixture to a temperature ranging from 60° to 70° F. to remove any dissolved butenes, heating the remaining cuprous salt solution free of butenes to a temperature ranging from 140° to 150° F. and submitting the overhead distillate to a reflux action by maintaining the temperature of the gases expelled between 70° and 80° F., and fractionally heating the cuprous salt solution to progressively increasing temperatures to separately remove acetylenes and allenes.

9. Process of separating and segregating butadiene which comprises contacting a hydrocarbon mixture containing butadiene and acetylenes at a temperature ranging from 20° to 40° F. with an aqueous solution containing 3 mols per liter of cuprous complex, 4 mols per liter acetate and 10 to 11 mols per liter of total ammonia, heating the said cuprous salt solution after it has been separated from the unabsorbed hydrocarbon mixture to a temperature ranging from 60° to 70° F. to remove any dissolved butenes, heating the remaining cuprous salt solution free of butenes to a temperature ranging from 140° to 150° F. and submitting the overhead distillate to a reflux action by maintaining the temperature of the gases expelled between 70° and 80° F., and fractionally heating the cuprous salt solution to progressively increasing temperatures to separately remove acetylenes.

CHARLES E. MORRELL.
MILLER W. SWANEY.